(12) United States Patent
Guzman-Magana et al.

(10) Patent No.: US 11,845,301 B2
(45) Date of Patent: Dec. 19, 2023

(54) AERO RING INSERTS FOR WHEEL AERODYNAMICS

(71) Applicants: Arturo Guzman-Magana, Windsor (CA); Tracy L Schmidt, Fenton, MI (US); Irina Zavatski, Rochester Hills, MI (US)

(72) Inventors: Arturo Guzman-Magana, Windsor (CA); Tracy L Schmidt, Fenton, MI (US); Irina Zavatski, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 377 days.

(21) Appl. No.: 17/108,615

(22) Filed: Dec. 1, 2020

(65) Prior Publication Data

US 2022/0169070 A1 Jun. 2, 2022

(51) Int. Cl.
*B60B 7/01* (2006.01)
*B60B 7/06* (2006.01)
*B60B 3/10* (2006.01)

(52) U.S. Cl.
CPC ............ *B60B 7/01* (2013.01); *B60B 7/061* (2013.01); *B60B 3/10* (2013.01); *B60B 2360/10* (2013.01); *B60B 2360/32* (2013.01); *B60B 2900/1216* (2013.01)

(58) Field of Classification Search
CPC .. B60B 7/01; B60B 7/061; B60B 3/10; B60B 2360/10; B60B 2360/32; B60B 2900/1216
See application file for complete search history.

(56) References Cited

U.S. PATENT DOCUMENTS

| 2005/0248212 | A1* | 11/2005 | Tanno | B60B 21/04 301/95.108 |
| 2009/0195053 | A1 | 8/2009 | Kruse et al. | |
| 2015/0174955 | A1* | 6/2015 | Von Tardy-Tuch | B60B 21/026 301/95.101 |

FOREIGN PATENT DOCUMENTS

| DE | 20122871 U1 * | 12/2008 | ............... B60B 7/01 |
| DE | 102011114664 A1 | 4/2012 | |
| JP | 2018020591 A | 2/2018 | |

* cited by examiner

*Primary Examiner* — Scott A Browne
(74) *Attorney, Agent, or Firm* — Jeremy J. Klobucar

(57) ABSTRACT

An air deflection ring that is configured to be attached to a wheel of a motor vehicle that includes a barrel including a cylindrical inner surface and an opposing cylindrical outer surface, a plurality of spokes that are each separated by an opening and attach the barrel to a center of the wheel. The air deflection ring includes a cylindrical mounting ring that is configured to be fixed to the cylindrical inner surface of the barrel, and an air deflection flange that extends radially inwardly toward the center of the wheel from the cylindrical mounting ring. The cylindrical mounting ring is configured to be fixed to the cylindrical inner surface of the barrel at a location positioned immediately adjacent to the plurality of spokes, and the air deflection flange is configured to direct a flow of air away from the openings during rotation of the wheel.

10 Claims, 4 Drawing Sheets

AERO RING INSERTS FOR WHEEL AERODYNAMICS

FIELD

The present disclosure relates a ring attachment for a vehicle wheel that improves aerodynamics of the vehicle wheel.

BACKGROUND

Improving fuel economy is an ever-increasing goal when developing a motor vehicle. Manners of improving fuel economy include improving engine efficiency, making the vehicle lighter by using improved lighter-weight materials, improving the aerodynamics of the vehicle, and the like. An often-overlooked aspect of the vehicle that can negatively affect fuel economy is the drag that develops during rotation of the vehicle wheels. In this regard, the vehicle wheels typically have openings formed therein that permit air to flow through the openings, which can assist in cooling the brakes of the vehicle. The air flow through the openings, however, can negatively affect the fuel economy of the vehicle if the openings create too much drag.

SUMMARY

The present disclosure provides an air deflection ring that is configured to be attached to a wheel of a motor vehicle that includes a barrel including a cylindrical inner surface and an opposing cylindrical outer surface, a plurality of spokes that are each separated by an opening and attach the barrel to a center of the wheel. The air deflection ring includes a cylindrical mounting ring that is configured to be fixed to the cylindrical inner surface of the barrel, and an air deflection flange that extends radially inwardly toward the center of the wheel from the cylindrical mounting ring. The cylindrical mounting ring is configured to be fixed to the cylindrical inner surface of the barrel at a location positioned immediately adjacent to the plurality of spokes, and the air deflection flange is configured to direct a flow of air away from the openings during rotation of the wheel.

In addition, the present disclosure provides a wheel for a motor vehicle that includes a barrel including a cylindrical inner surface and an opposing cylindrical outer surface, the cylindrical outer surface being configured to be attached to a tire; a plurality of spokes that attach the barrel to a center of the wheel that defines a center bore that is configured to attach the wheel to the motor vehicle, adjacent spokes being separated by an opening; and an air deflection ring including a cylindrical mounting ring that is fixed to the cylindrical inner surface of the barrel and an air deflection flange that extends radially inwardly toward the center of the wheel from the cylindrical mounting ring, wherein the air deflection ring is located immediately adjacent to the plurality of spokes, and the air deflection flange directs a flow of air away from the opening during rotation of the wheel.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
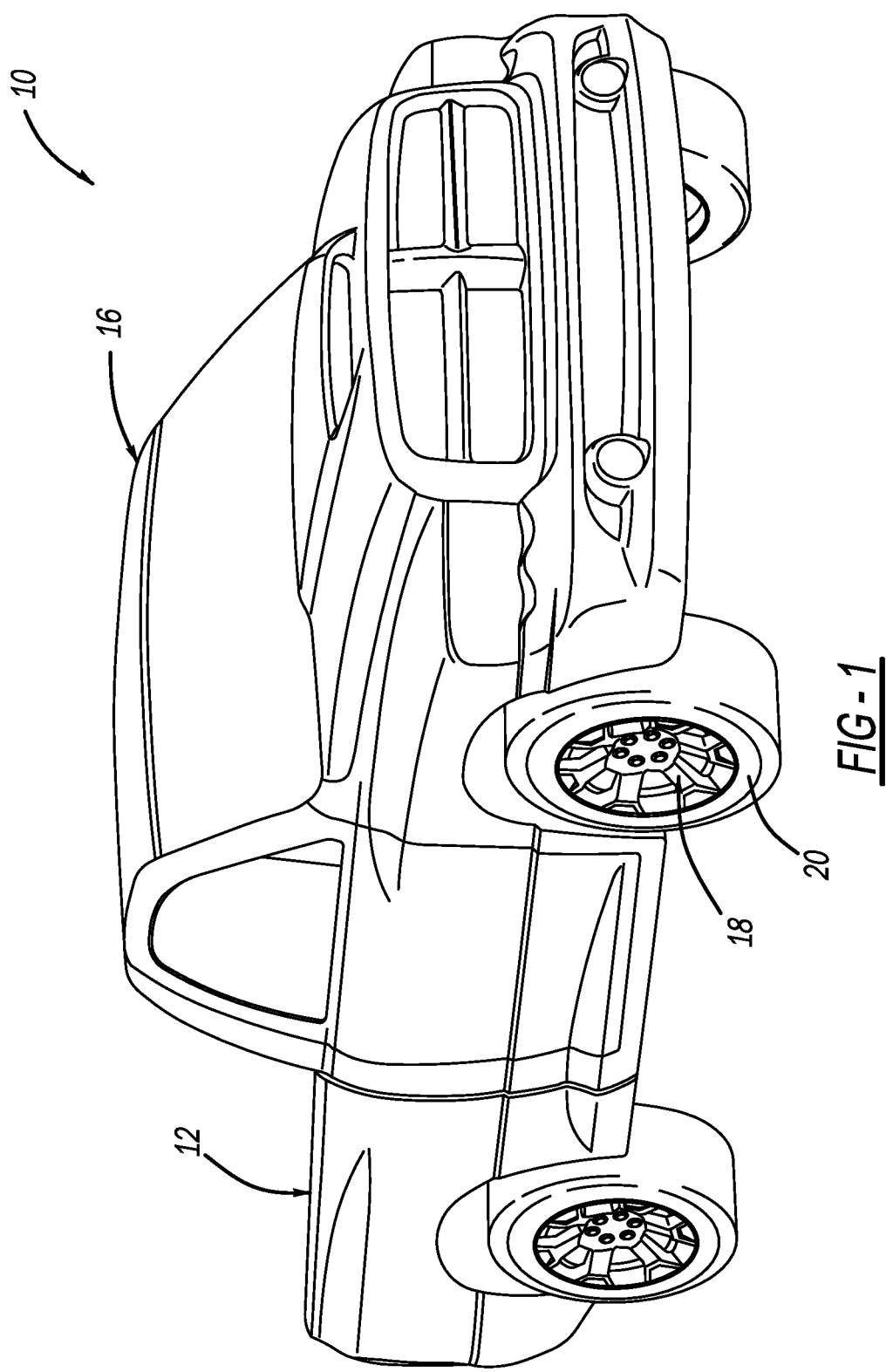
FIG. 1 is a perspective view of an example vehicle including a plurality of wheels.

FIG. 1 partially illustrates a vehicle 10. Vehicle 10 is a pickup truck including a bed 12, a forward cab or passenger compartment 16, and a wheel 18 including a tire 20. Although only two wheels 18 and tires 20 are illustrated, one skilled in the art will readily acknowledge and appreciate that vehicle 10 includes four wheels 18 and tires 20. It should be understood, however, that vehicles 10 including a greater or lesser number of wheels 18 and tires 20 are contemplated by the present disclosure. For example, vehicle 10 may be a motorcycle including two wheels, a three-wheel motorcycle or all-terrain vehicle, or a vehicle including more than four wheels as are well known in the art.

Figure 2:
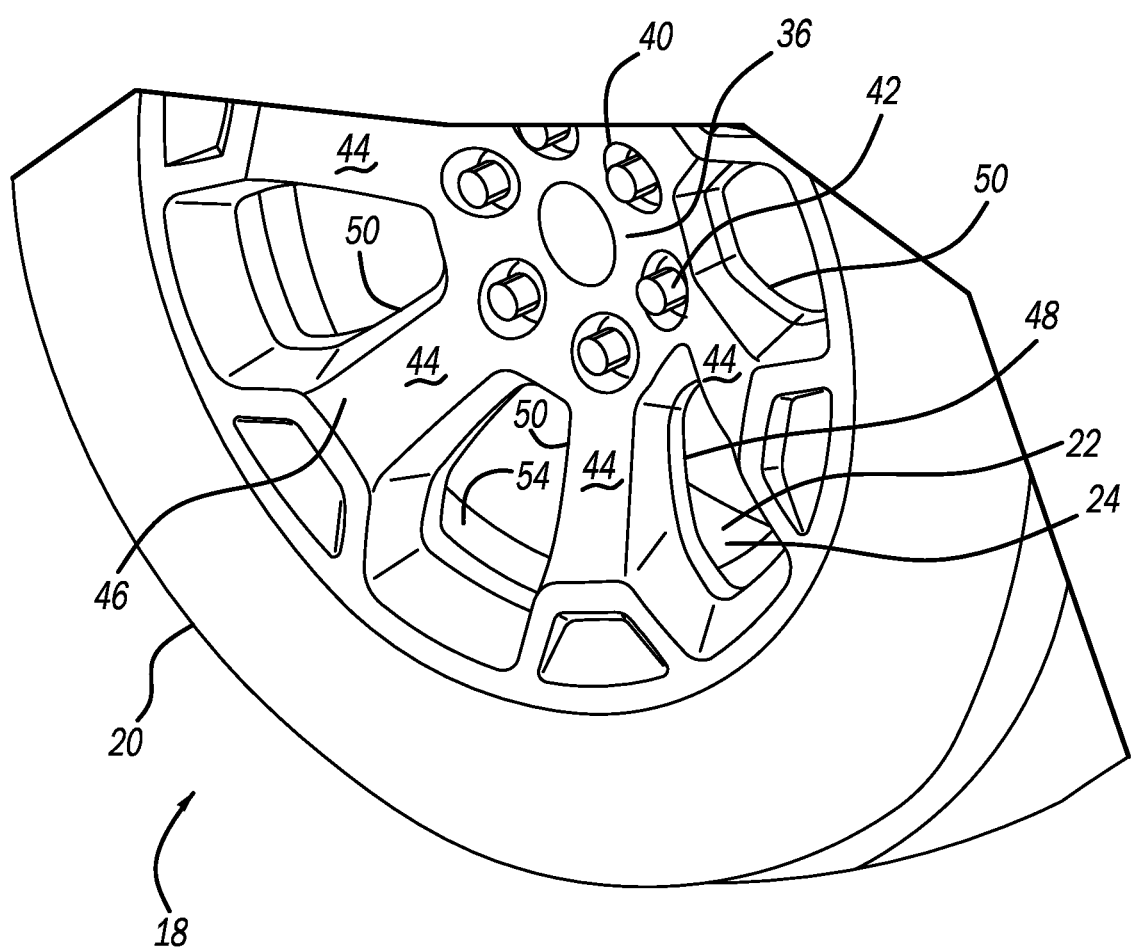
FIG. 2 is a partial perspective view of one of the wheels illustrated in FIG. 1.
Figure 3:
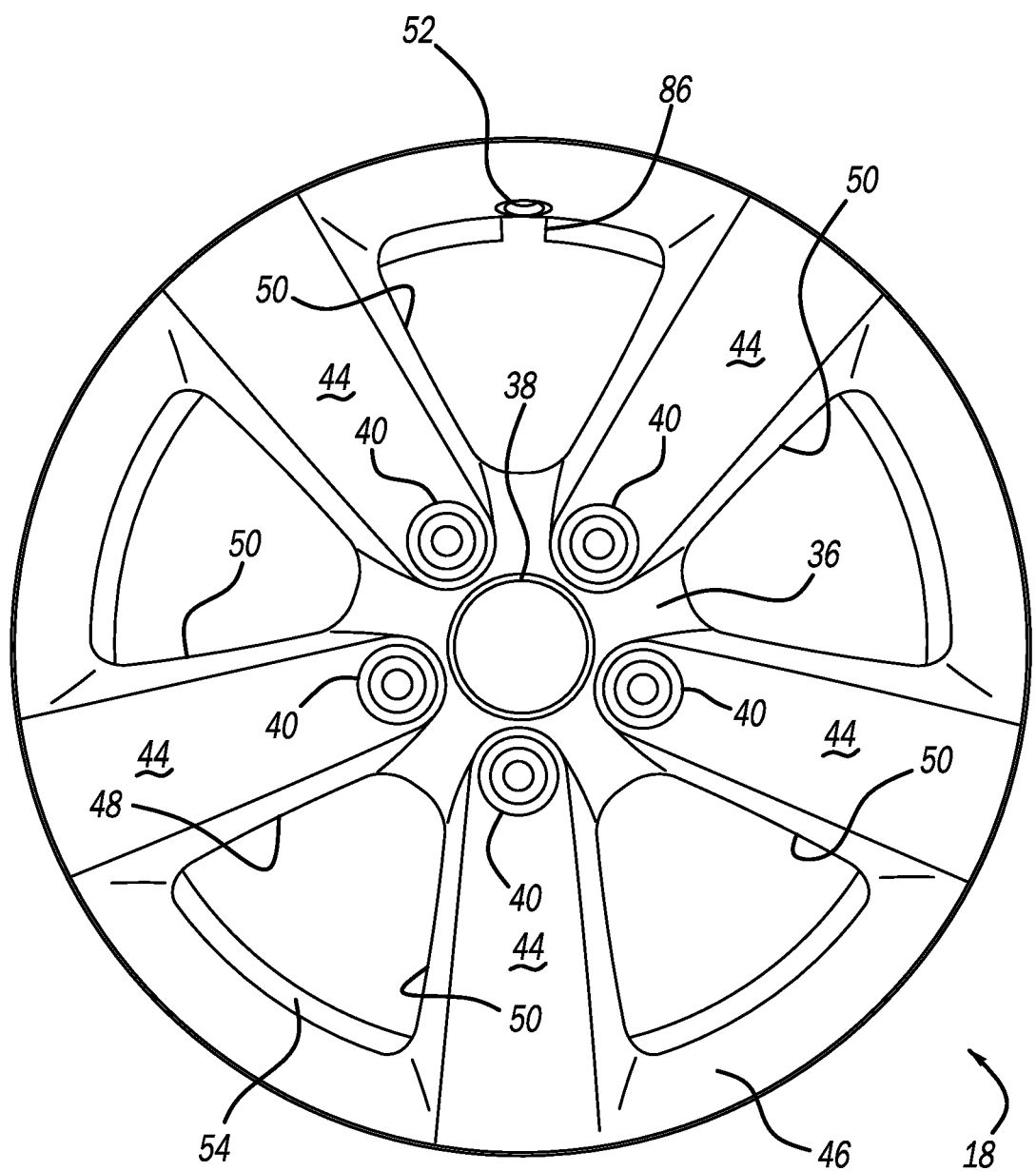
FIG. 3 is a perspective view of another vehicle wheel, with a tire removed and including an air deflection ring according to a principle of the present disclosure.
Figure 4:
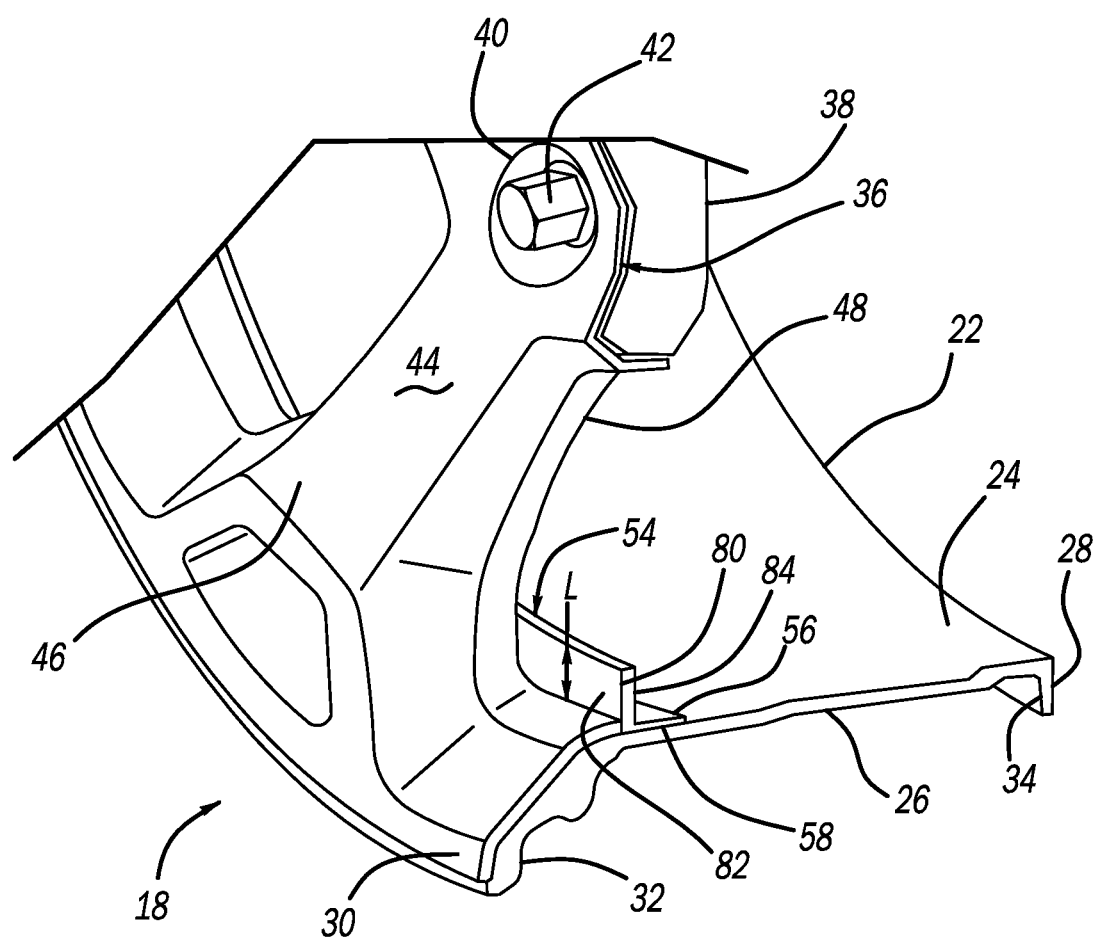
FIG. 4 is a partial perspective cross-sectional view of the wheel illustrated in FIG. 2, with a tire removed and including an air deflection ring according to a principle of the present disclosure.

Now referring to FIGS. 2-4, it can be seen that wheel 18 includes a barrel 22 that may be formed of a rigid material such as a metal material such as steel, aluminum, or any other metal alloy materials known to one skilled in the art. Barrel 22 is a generally cylindrical structure including an inner surface 24, an outer surface 26, an inner edge 28, and an outer edge 30. Tire 20 mounts to the outer surface 26 of barrel 22. Specifically, barrel 22 includes a first flange 32 extending radially outwardly from outer surface 26 at outer edge 30 and a second flange 34 extending radially outwardly from outer surface 26 at inner edge 28, and tire 20 mounts to wheel 18 between the first and second flanges 32, 34, as is known in the art A center 36 of wheel 18 defines a center bore 38, which is an opening that is configured to mate with a hub (not shown) of an axle (not shown) of vehicle 10. In this regard, center 36 includes a plurality of lug holes 40 configured for receipt of fasteners 42 that secure wheel 18 to the hub (not shown). Extending radially outwardly from center 36 of wheel 18 are a plurality of spokes 44. Spokes 44 each include an outer or decorative surface 46 and an inner surface 48. Spokes 44 connect center 36 of wheel 18 to barrel 22. Openings 50 are formed between each of the spokes 44. In addition, wheel 18 also includes an aperture 52 configured for receipt of a valve stem (not shown) of tire 20. Although wheel 18 is illustrated in FIGS. 1, 2, and 4 includes six spokes 44 and wheel 18 illustrated in FIG. 3 includes five spokes 44, it should be understood that a greater or lesser number of spokes 44 are contemplated.

As wheel 18 rotates, air may travel through openings 50 between spokes 44. This air flow through openings 50 can form "wakes" of air flow through the wheel 18 that are turbulent, and can increase drag on the wheel 18 and vehicle 10 as the wheel 18 rotates, which can reduce fuel economy. In other words, the wakes can negatively affect the aerodynamic properties of the wheel 18. In order to reduce air flow through the openings 50 formed between spokes 44, wheel 18 includes an air deflection ring 54 mounted to inner surface 24 of barrel 22. Specifically, air deflection ring 54 is mounted to inner surface 24 of barrel 22 directly adjacent inner surface 48 of spokes 44.

Air deflection ring 54 is generally L-shaped in cross-section, and includes a cylindrical mounting ring 56 that is fixed to inner surface 24 of barrel. 22. Mounting ring 56 may be fixed to inner surface 24 of barrel 22 by an adhesive 58. Other attachment methods such as, for example, welding or brazing are contemplated. An air deflection flange 80 extends radially inwardly (i.e., in a direction toward center 36 of wheel 18) from mounting ring 56. Air deflection flange 80 may be unitary formed along with mounting ring 56, or air deflection flange 80 may be a member that is manufactured separately from mounting ring 56 and subsequently attached to mounting ring 56 to form a single piece. Air deflection ring 54 is preferably formed of a lightweight material such as aluminum, but may be formed of any rigid material known to one skilled in the art including metal materials, alloy materials, polymeric materials, carbon fibers interspersed in a polymeric or resin material, and the like.

Air deflecting flange 80 includes an annular surface 82 that faces inner surface 48 of spokes 44, and an opposite annular surface 84 that faces inner edge 28 of barrel 22. An aperture or recess 86 may be formed in air deflecting flange 80 that corresponds to a location of aperture 52 formed in wheel 18 for a valve stem (not illustrated) of the tire 20. A length L of air deflecting flange 80 is generally in the range of 0.5 to 2 inches. Mounting ring 56 includes a similar length. It should be understood, however, that the length L of air deflecting flange 80 and the length of mounting ring 56 is variable, and can be selected on a variety of factors including the diameter of wheel 18, a size of the openings 50 between the spokes 44, a size of the spokes 44, and the number of spokes 44. In any event, it should be understood that air deflecting flange 80 is sized to at least partially block or deflect air flow through openings 50. By deflecting air flow in a direction away from the openings 50, the turbulent air flow "wakes" that occur during rotation of wheel 18 can be reduced, which reduces the drag on wheel 18 and vehicle 10 as the wheel 18 rotates. In this manner, the aerodynamic properties of the wheel 18 are improved, which can assist in increasing fuel economy of the vehicle 10. Indeed, upon testing of air deflection ring 54 on a vehicle wheel 18, the drag of wheel 18 was reduced such that a 0.5 mile per gallon improvement in fuel economy was observed While it is desirable to reduce the formation of the turbulent air flow wakes through the openings 50 between the spokes 44 to improve the aerodynamic properties of the wheel 18 as it rotates, it should also be understood that one of the beneficial aspects of the present disclosure is that air deflection ring 54 does not negatively affect the ornamental appearance of wheel 18. More specifically, if one solely wanted to improve the aerodynamic features of wheel 18, the openings 50 between the spokes 44 would be omitted (i.e., the wheel 18 would include a plate devoid of openings 50 that extends between center bore 38 and barrel 22 rather than spokes 44), or the openings 50 would be entirely blocked by air deflection ring 54. Such a configuration, however, would add increased weight to wheel 18 due to the increase in material needed for an air deflection ring 54 that entirely blocks the openings 50, and such a configuration would negatively affect the ornamental appearance of the wheel 18. Because air deflecting flange 80 only partially blocks openings 50, the ornamental appearance of wheel 18 is not degraded. In this regard, air deflection ring 56 may be designed to block up to 20% of the openings 50.

Moreover, it should be understood that air deflecting flange 80 blocks the openings 50 between spokes 44 at the most effective region of the openings 50 to reduce the formation of the air wakes that are generated during rotation of wheel 18. That is, the outer circumference 86 of openings 50 located proximate outer edge outer edge 30 of barrel 22 is typically the location of wheel 18 where air circulation at openings 50 tends to generate the air wakes and increase drag. Thus, forming air deflecting flange 80 to have length L that only blocks openings 50 at this location, notable improvements in the aerodynamic properties of the wheel 18 can be obtained. In other words, air deflecting flange 80 should be located immediately adjacent to the inner surface 48 of spokes 44. While the phrase "immediate adjacent" does not mean that air deflecting flange 80 should abut inner surface 48 of spokes 44, it should be understood that air deflecting flange 80 should be located as close to inner surface 48 of spokes 44 as possible to reduce the air flow at this location.

As noted above, air deflecting ring 54 is preferably manufactured separate from wheel 18. Air deflecting ring 54, therefore, can be available as an aftermarket part in various sizes that can be fixed on any size wheel 18 (e.g., 15 inch diameter wheels, 16 inch diameter wheels, 18 inch diameter wheels, 20 inch diameter wheels, 22 inch diameter wheels, etc.) without affecting the ornamental appearance of the wheel 18. Moreover, air deflecting ring 54 is a passive solution to improving the aerodynamic properties of the wheel 18. That is, air deflecting ring 54 does not require moving parts or actuators that can selectively block openings 50 of the wheel 18 when desired. This reduces the overall cost to manufacture ring 54, and does not require any electrical connection to vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A wheel for a motor vehicle, comprising:
  a barrel including a cylindrical inner surface and an opposing cylindrical outer surface that each extend between an inner edge of the barrel and an outer edge of the barrel, the cylindrical outer surface being configured to be attached to a tire;

a plurality of spokes connected to the outer edge of the barrel and that attach the barrel to a center of the wheel that defines a center bore that is configured to attach the wheel to the motor vehicle, each of the plurality of spokes including an interior surface that faces the inner edge of the barrel and an opposite exterior surface, and adjacent spokes being separated by an opening; and an air deflection ring including a cylindrical mounting ring that is fixed to the cylindrical inner surface of the barrel proximate the outer edge and an air deflection flange that extends radially inwardly toward the center of the wheel from the cylindrical mounting ring, the air deflection flange abutting the inner surface of each of the plurality of spokes, and a terminal edge of the cylindrical mounting ring that is distal from the air deflection flange being spaced apart from the inner edge of the barrel, wherein the air deflection flange directs a flow of air away from the opening during rotation of the wheel.

2. The wheel according to claim 1, wherein the air deflection ring is L-shaped in cross-section.

3. The wheel according to claim 1, wherein the cylindrical mounting ring is fixed to the cylindrical inner surface of the barrel by an adhesive.

4. The wheel according to claim 1, wherein the air deflection ring is formed of a rigid metal or polymeric material.

5. The wheel according to claim 1, wherein the air deflection flange is configured to block up to 20% of the opening.

6. An air deflection ring configured to be attached to a wheel of a motor vehicle that includes a barrel that is configured to be attached to a tire, the barrel including a cylindrical inner surface and an opposing cylindrical outer surface that each extend between an inner edge of the barrel and an outer edge of the barrel, a plurality of spokes connected to the outer edge of the barrel, each of the plurality of spokes including an interior surface that faces the inner edge of the barrel and an opposite exterior surface, each of the spokes being separated by an opening, and each of the spokes attaching the barrel to a center of the wheel, the air deflection ring comprising:

a cylindrical mounting ring that is configured to be fixed to the cylindrical inner surface of the barrel proximate the outer edge; and an air deflection flange that extends radially inwardly toward the center of the wheel from the cylindrical mounting ring, the air deflection flange being configured to abut the inner surface of each of the plurality of spokes, and a terminal edge of the cylindrical mounting ring that is distal from the air deflection flange is configured to be spaced apart from the inner edge of the barrel, wherein the air deflection flange is configured to direct a flow of air away from the openings during rotation of the wheel.

7. The air deflection ring according to claim 6, wherein the air deflection ring is L-shaped in cross-section.

8. The air deflection ring according to claim 6, wherein the cylindrical mounting ring is configured to be fixed to the cylindrical inner surface of the barrel by an adhesive.

9. The air deflection ring according to claim 6, wherein the air deflection ring is formed of a rigid metal or polymeric material.

10. The air deflection ring according to claim 6, wherein the air deflection flange is configured to block up to 20% of the opening.

\* \* \* \* \*